May 13, 1958  L. P. CROSS  2,834,042
SAUSAGE LINKING MACHINE
Filed April 14, 1954  10 Sheets-Sheet 1
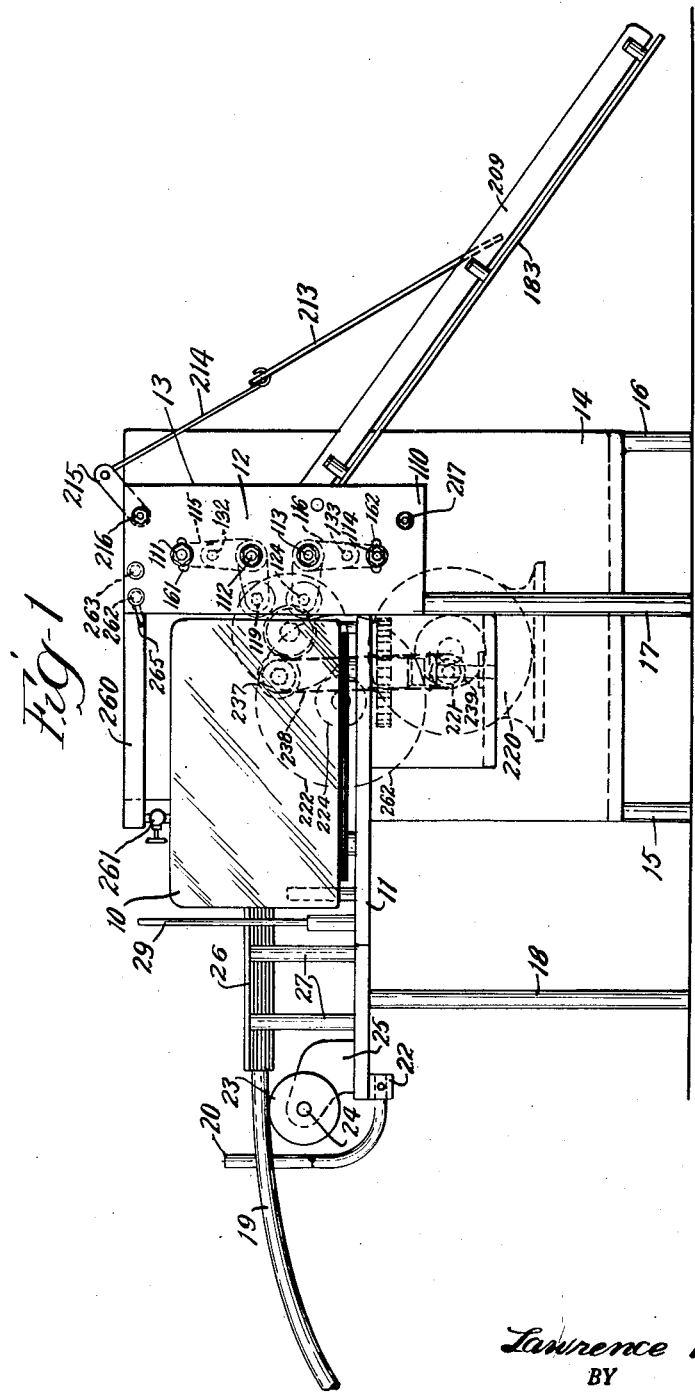
INVENTOR.
Lawrence P. Cross
BY
Cromwell, Greist & Warden
Attys.

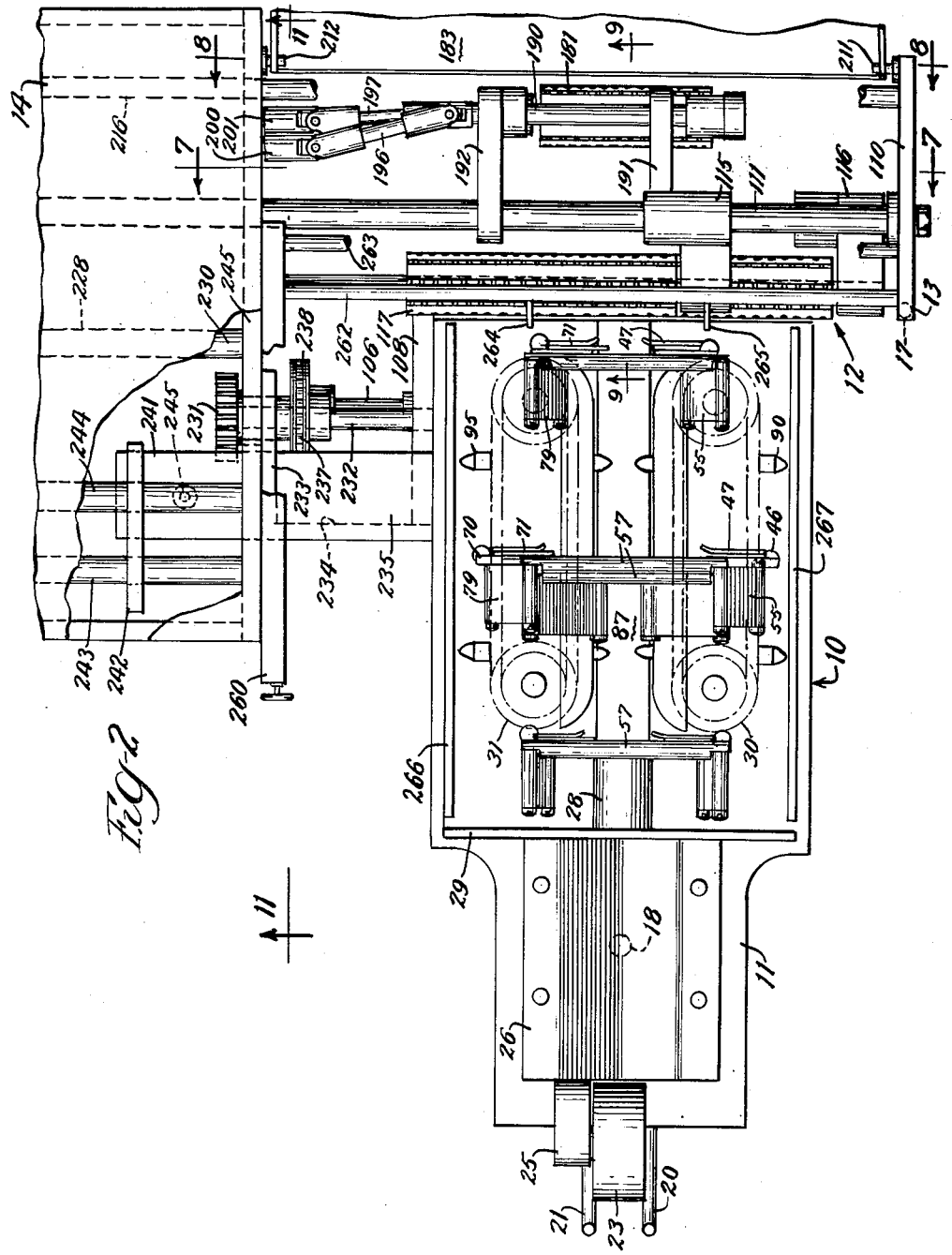

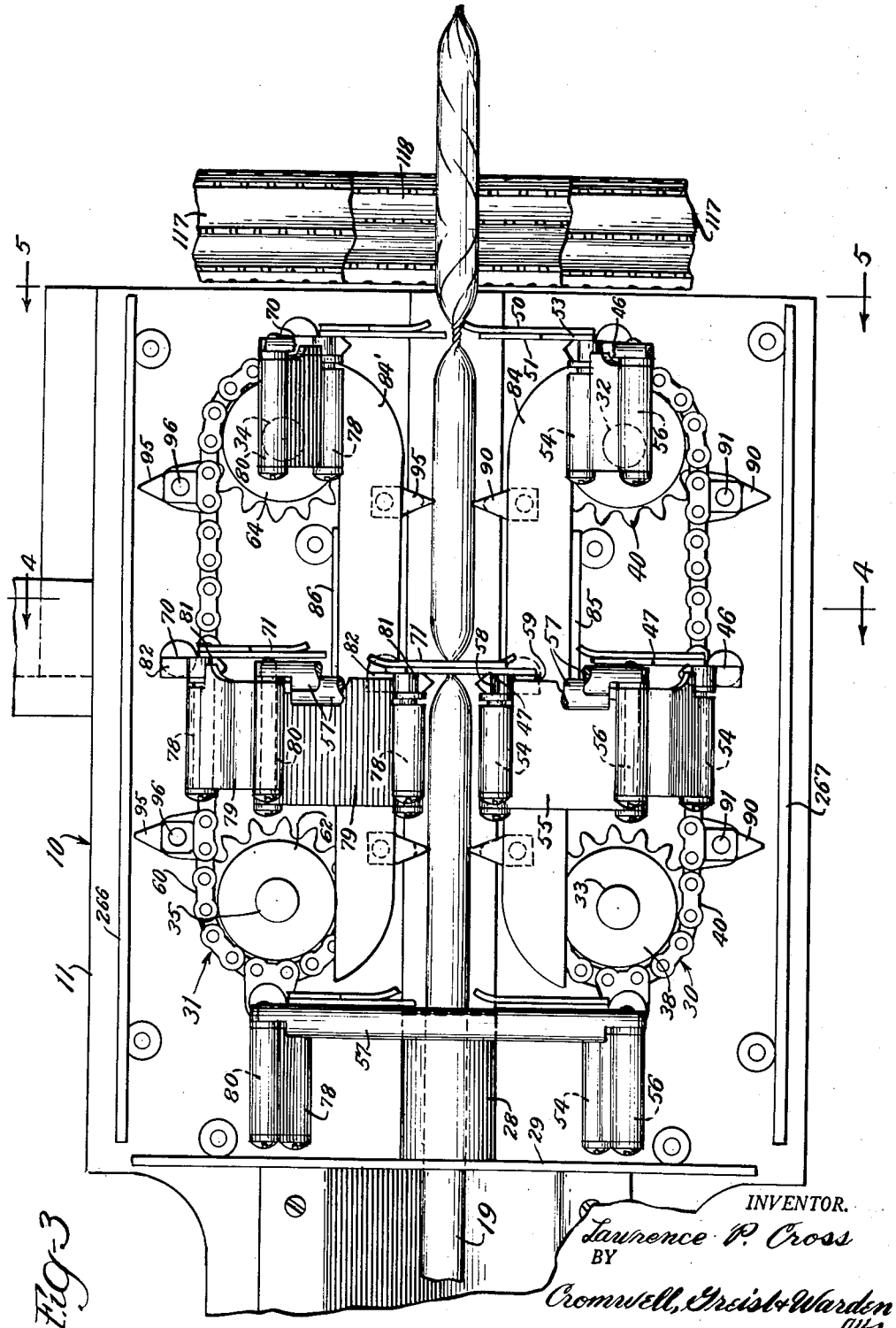

May 13, 1958     L. P. CROSS     2,834,042
SAUSAGE LINKING MACHINE
Filed April 14, 1954     10 Sheets-Sheet 4
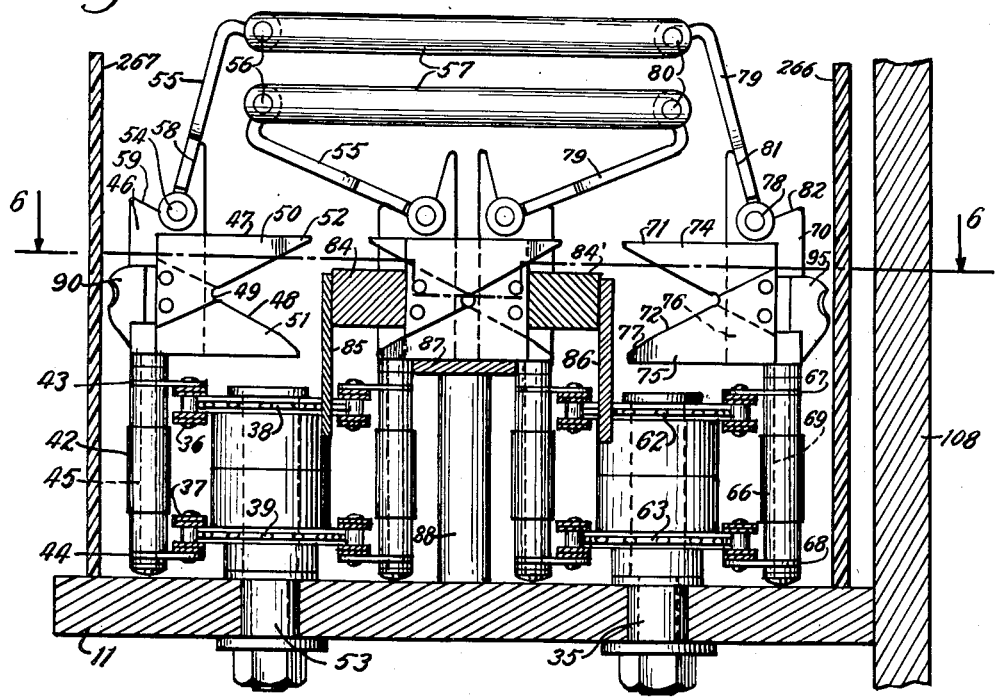
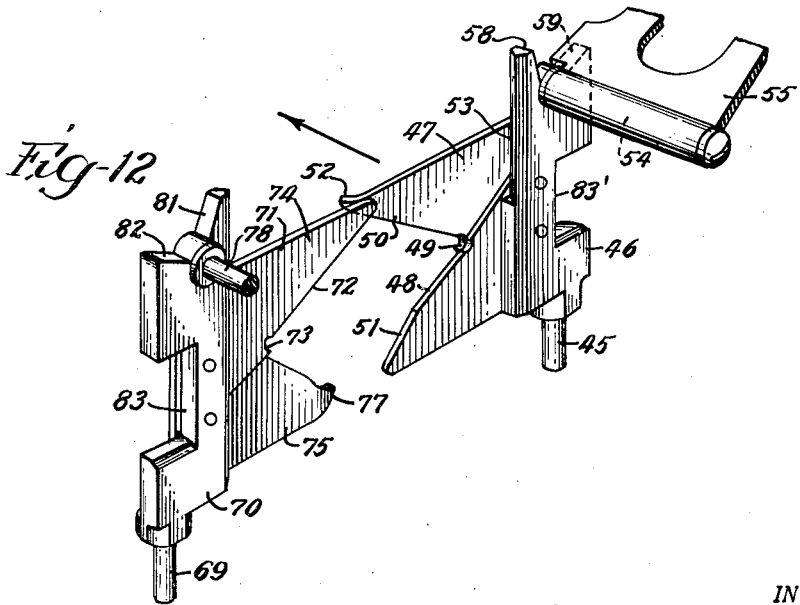
INVENTOR.
Lawrence P. Cross.
BY
Cromwell, Greist & Warden
Attys.

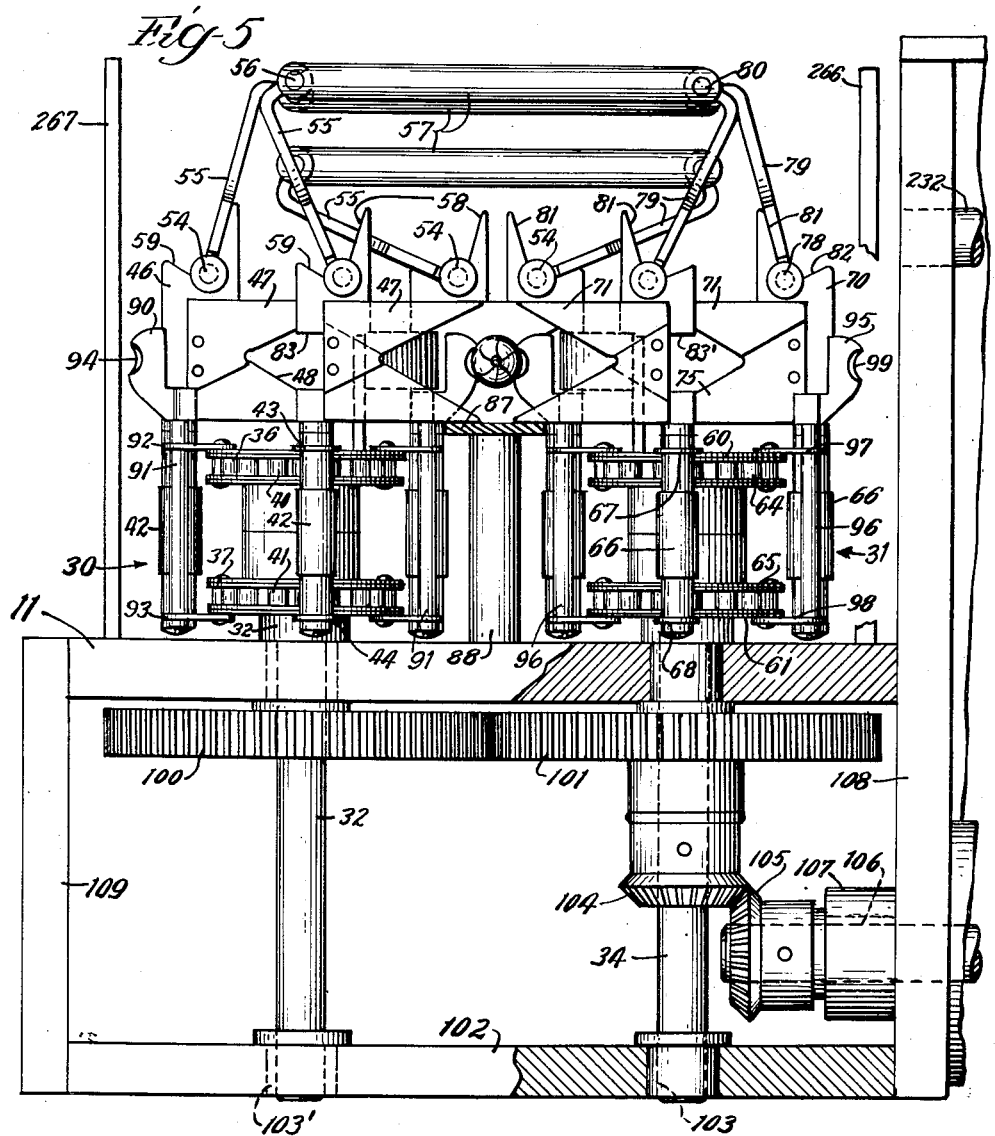

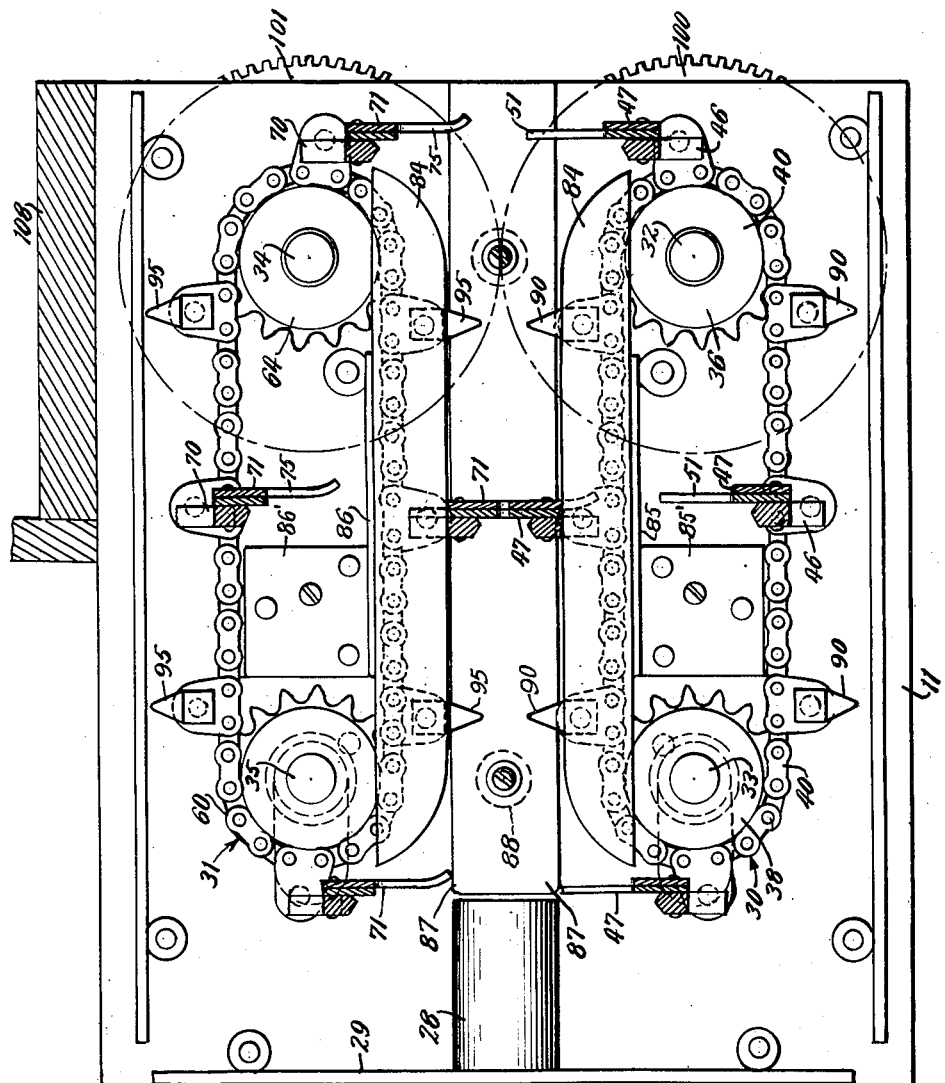

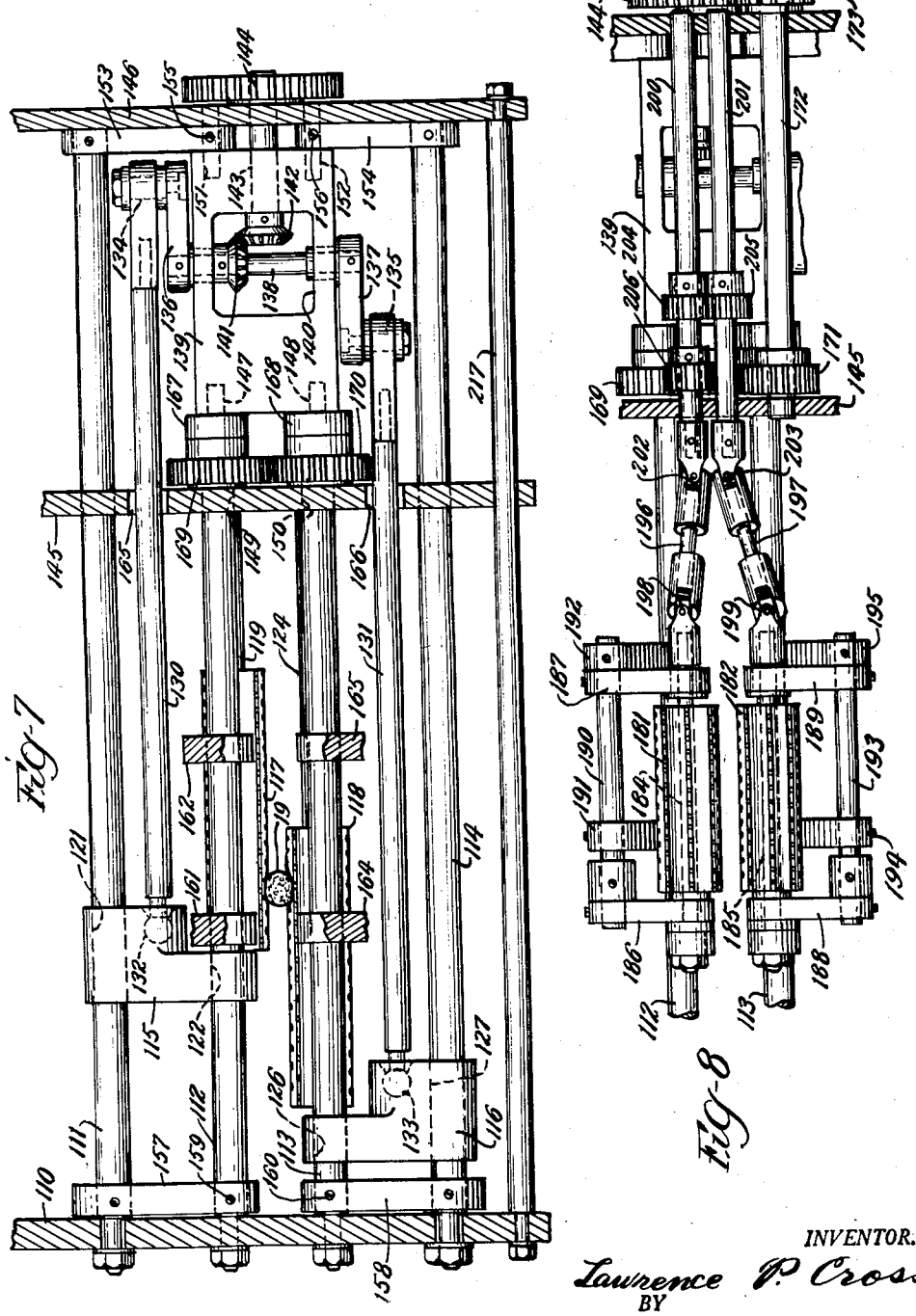

May 13, 1958
L. P. CROSS
2,834,042
SAUSAGE LINKING MACHINE
Filed April 14, 1954
10 Sheets-Sheet 8
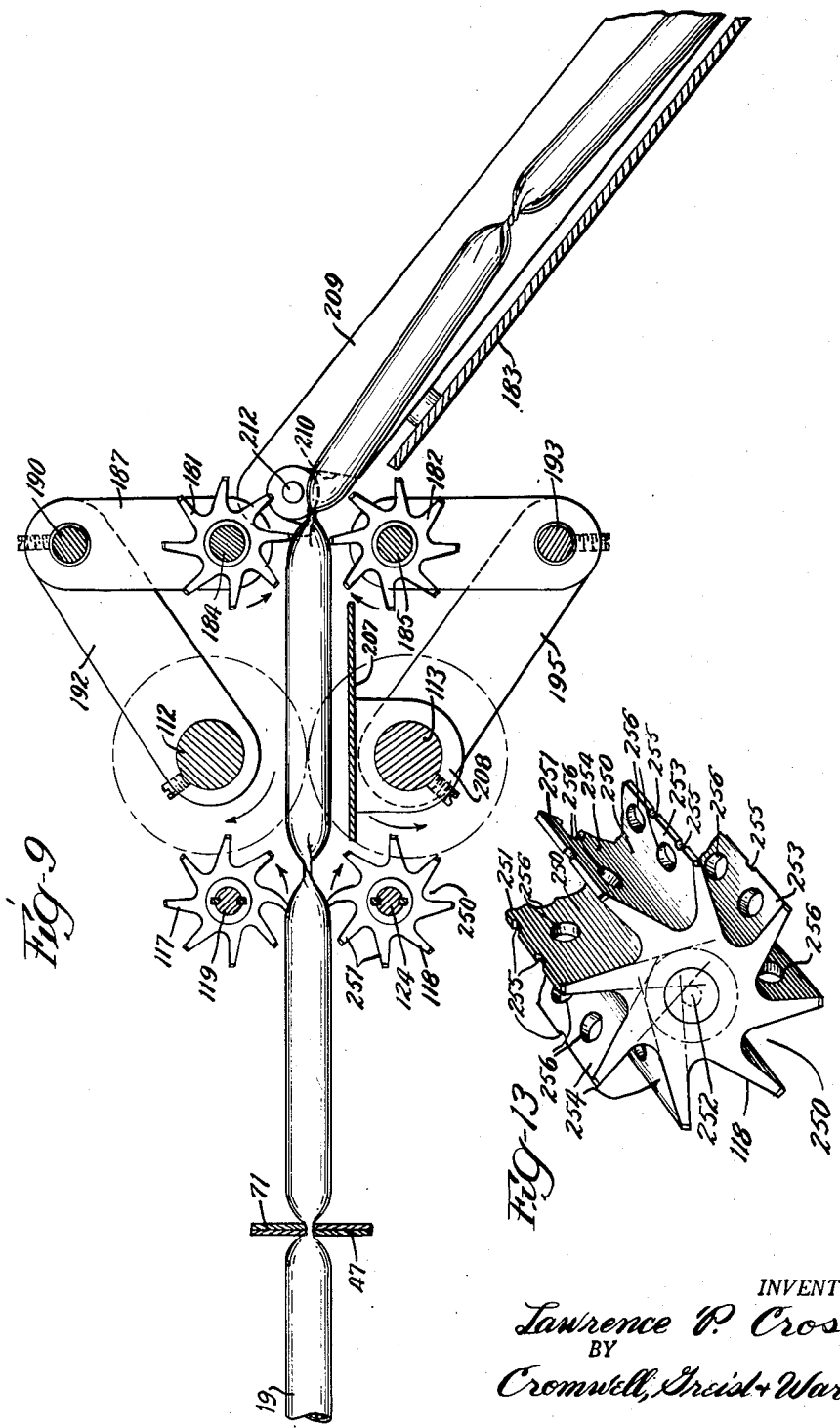
INVENTOR.
Lawrence P. Cross
BY
Cromwell, Greist + Warden
Atty's.

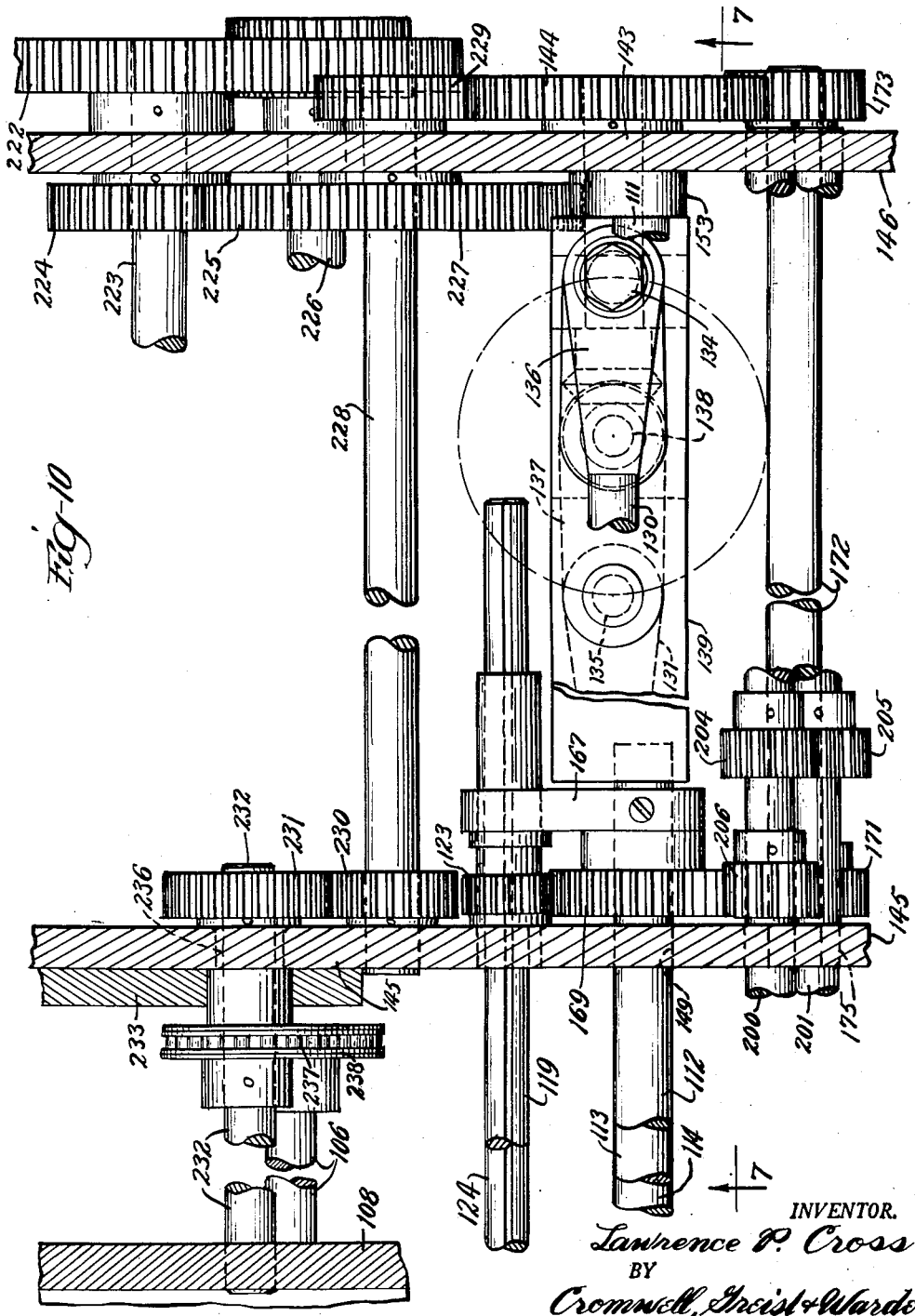

2,834,042
SAUSAGE LINKING MACHINE
Lawrence P. Cross, Valparaiso, Ind.

Application April 14, 1954, Serial No. 423,135

12 Claims. (Cl. 17—34)

This invention relates to the manufacture of sausages of the character in which a length of filled and stuffed casing is divided into individual sausage links of generally uniform length and a twist is imparted to the casing between the successive links.

It is a general object of the invention to provide an improved mechanism for the production of link sausages which mechanism will divide a filled casing at predetermined intervals to form individual sausage links of uniform length and automatically rotate the successive links to provide a twist in the casing in the area between each link and the adjoining links.

It is another object of the invention to provide a linking machine which is particularly adapted for the production of sausages of the type which are stuffed in a natural casing, which machine comprises mechanism for advancing a length of the stuffed casing continuously while dividing the same into link forming sections and mechanism for twisting each successive link in a continuous operation with the mechanism being so constructed that the links are formed and twisted in a uniform manner without damage to the casing.

It is a further object of the invention to provide a sausage linking machine having mechanism for continuously advancing a filled sausage casing and for dividing the same into sections of uniform length and mechanism for twisting each successive link section, wherein the twisting mechanism comprises two rotatable rollers mounted for reciprocation in the direction of their axis and transversely of the path of advancing movement of the casing, which rollers are arranged to engage on opposite sides of each successive link and to rotate the link as it advances between the same whereby to impart a twist between it and the next succeeding link without tearing the casing or hindering the travel of the same through the machine.

It is another object of the invention to provide a mechanism for forming from a long length of stuffed casing a plurality of relatively short links wherein the stuffed casing is advanced between a pair of conveyors having cooperating dividing fingers thereon for dividing the casing into link forming sections, the divided link sections are delivered to a pair of constantly rotating twisting rollers which are mounted for transverse reciprocation and which engage each successive link as it passes between the same to rotate the link about its axis and impart a twist between it and the next succeeding link while advancing the link through the machine.

It is a further object of the invention to provide in a linking machine of the type described means for continuously feeding a filled casing in a predetermined path and for dividing the same into a plurality of link forming sections of uniform length, which comprises a pair of conveyor mechanisms arranged on opposite sides of the path of movement of the casing, cooperating casing constricting members arranged on the conveyor mechanisms which engage the casing from opposite sides and travel therewith over a predetermined portion of the path of the latter, the mechanism connecting each casing constricting member in paired relation with a cooperating casing constricting member on the opposite conveyor and holding said paired constricting members in predetermined transverse alignment while they are in constricting engagement with the casing.

It is another object of the invention to provide in a filled casing advancing and divider mechanism, a pair of endless conveyors, which conveyors are arranged on opposite sides of the path of advancing movement of the casing and present opposed conveyor runs which are in generally parallel spaced planes and between which the filled casing is advanced, longitudinally spaced divider plates mounted on each conveyor, each of the divider plates being connected to its cooperating divider plate by an overhead linkage which holds the divider plates in transverse alignment as they are moved by the conveyors, and the linkages being so constructed that they move toward and from the divider plates as the divider plates move into and out of the opposed conveyor runs whereby the linkages pass each other without interference as the divider plates engage and divide the casing.

It is another object of the invention to provide in a linking mechanism a link advancing roll structure having circumferentially spaced axially extending radially directed ribs which are formed of readily flexible material arranged so that the portion thereof which strikes the wall of the casing as the same is engaged and advanced by the roll readily conforms to the contour of the casing at the point of contact therewith and advances the casing in its path without damage to the casing.

These and other objects and advantages of the invention will be apparent from a consideration of the linking machine which is shown by way of illustration in the accompanying drawing, wherein:

Fig. 1 is a side elevation of a linking machine having embodied therein the principal features of the invention;

Fig. 2 is a plan view of the machine, to an enlarged scale and with portions broken away;

Fig. 3 is a partial plan view of the link advancing and dividing mechanism, to a still further enlarged scale;

Fig. 4 is a transverse section taken on the line 4—4 of Fig. 3;

Fig. 5 is a transverse section taken on the line 5—5 of Fig. 3;

Fig. 6 is a longitudinal section taken on the line 6—6 of Fig. 4;

Fig. 7 is a vertical transverse section taken on the line 7—7 of Fig. 2, to an enlarged scale;

Fig. 8 is a transverse vertical section taken on the line 8—8 of Fig. 2, to an enlarged scale;

Fig. 9 is a longitudinal vertical section taken on the line 9—9 of Fig. 2, to an enlarged scale;

Fig. 10 is a horizontal section, with portions broken away, which shows the drive mechanism for the machine;

Fig. 12 is a perspective showing portions of a set of divider plates, and

Fig. 13 is an isometric end view of one of the twisting rollers.

Figure 11:
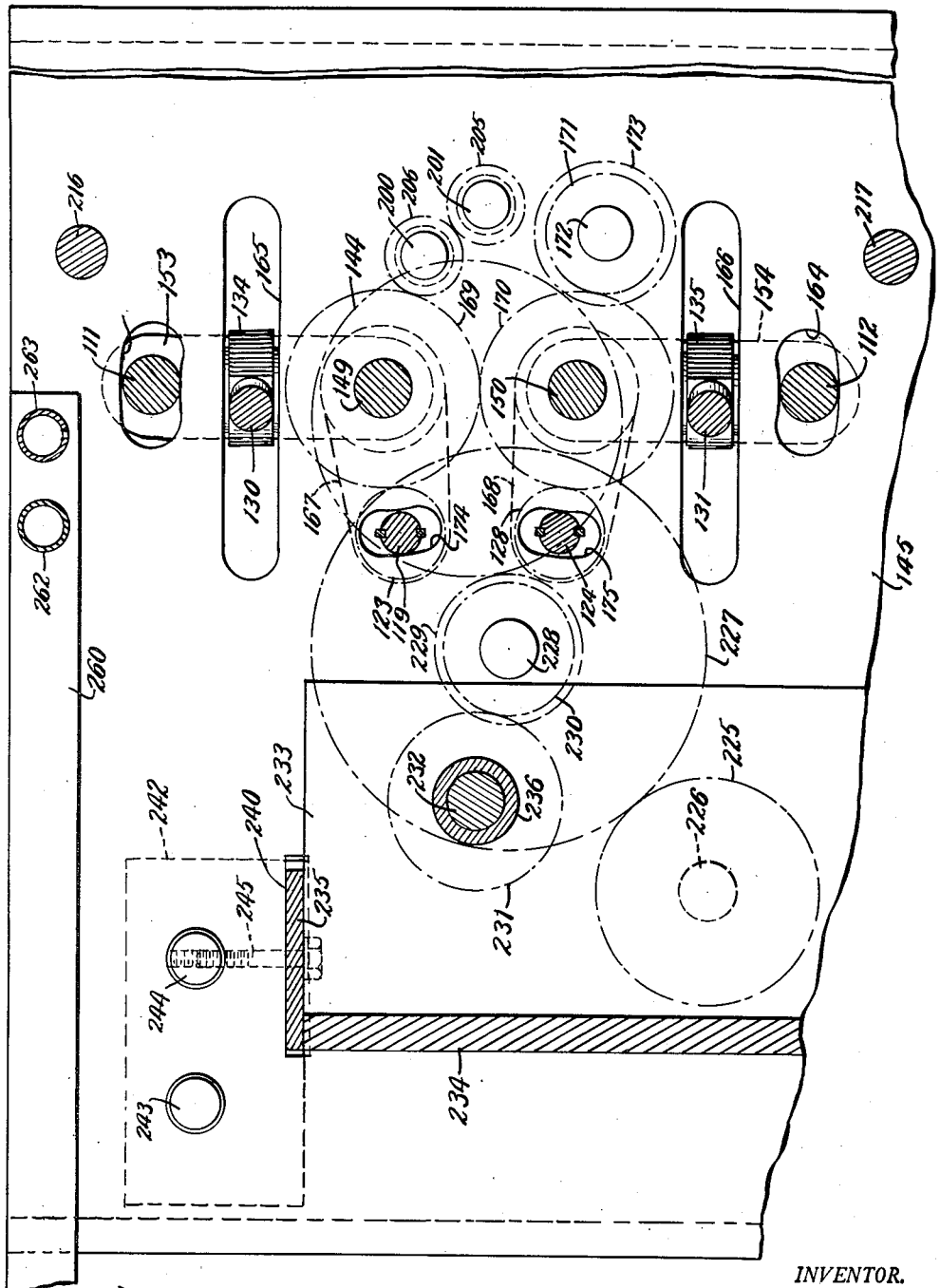
Fig. 11 is a cross section taken on line 11—11 of Fig. 2, to an enlarged scale and with portions broken away.

Referring to the drawings there is illustrated a mechanism constructed in accordance with the principles of the invention which will divide a continuous length of a filled casing into a plurality of links of predetermined length and which will rotate each successive link relative to the remainder of the filled casing to impart one or more twists between it and the next succeeding link while continuously advancing the links through the machine without damage to the relatively fragile casing.

In the illustrated mechanism (Figs. 1 and 2) there is provided a casing feeding and dividing mechanism 10, arranged on a horizontal plate support member 11, a twisting mechanism 12 mounted on a cross frame structure 13 at the forward end of the plate support member 11, and motor driven operating mechanism for the dividing and twisting mechanisms 10 and 12 which is enclosed in a transmission housing 14 arranged at one side of the plate support member 11. The transmission housing 14 which forms with the frame structure 13 the main frame for the machine is provided at its outer side with a pair of spaced depending leg members 15 and 16 while the frame structure 13 has a single depending leg member 17 at the opposite side of the machine. The horizontal plate support member 11 is detachably secured at its forward end to the transmission housing 14 and has a depending supporting leg 18 at its rear end.

The stuffed casing 19 is guided into the divider mechanism 10 by casing guiding and supporting members arranged above base plate 11 which comprise a pair of laterally spaced guide bars 20 and 21 (Figs. 1 and 2) having the top portions thereof projecting upwardly of the base plate 11 to form a guideway for the casing, and having the lower ends connected to the base plate 11 by a bracket 22. A casing supporting roller 23 is mounted on a transversely extending shaft 24 adjacent the guide bars 20 and 21, which shaft 24 is journaled in a supporting bracket 25. The guide roller 23 supports the casing 19 as it advances beyond the guide bars 20 and 21 to a guide plate 26, which guide plate 26 is arranged in the form of a horizontally extending trough or chute and which is supported above the base plate 11 by upstanding posts 27. From the guide trough 26 the filled casing 19 passes through a horizontal passageway formed by a guide tube 28 secured on a suitably apertured transversely extending guard plate 29 to the divider mechanism 10.

The divider mechanism 10 (Figs. 3 to 6) comprises a pair of oppositely disposed endless chain conveyors 30 and 31 which are arranged in longitudinally extending transversely spaced relation to provide a longitudinal path between opposed runs thereof for accommodating the stuffed casing 19. The conveyor 30 is supported on upstanding longitudinally spaced shafts 32, 33 and the conveyor 31 is supported on similar longitudinally spaced shafts 34, 35 which are arranged in laterally spaced parallel relation with the shafts 32, 33. The supporting shafts 32 and 34 at the forward ends of the conveyors 30 and 31 are power driven to operate the conveyors while the supporting shafts 33 and 35 at the opposite or trailing ends of the conveyors are idler shafts, which may be adjustably supported on the base plate 11.

The conveyor 30 comprises vertically spaced upper and lower endless chains 36 and 37 which are carried at the trailing ends on idler sprockets 38 and 39 rotatably mounted in vertically spaced relation on the shaft 33. At the forward end the chains 36 and 37 are carried on sprockets 40 and 41 which are secured in vertically spaced relation on the upper end portion of upstanding shaft 32 which is journaled in the base plate 11. The chain members 36 and 37 carry on their outboard side and in spaced relation a plurality of vertically extending tubular bearing forming members 42 each of which is secured at opposite ends to a chain link by means of upper and lower bracket plates 43 and 44. Each bearing tube 42 has pivotally mounted therein a post or shaft 45 with an upstanding top extension 46 thereon which has the form of a small plate of generally rectangular shape.

A generally rectangular divider plate member 47 is attached to one face of the shaft extension 46 and extends in a transverse vertical plane. The divider plate member 47 (Fig. 12) is provided at its inner vertical edge with an inwardly extending V-shaped groove 48 terminating at its apex in a curved portion 49 of relatively small radius, and dividing the plate 47 into upper and lower finger portions 50 and 51 of generally triangular form, with the upper finger forming portion 50 in a vertical plane which is offset forwardly relative to the plane of the lower finger forming portion 51 to permit interleaving of the fingers 50 and 51 with like members on a cooperating divider plate carried on the conveyor 31. The lower finger 51 is somewhat shorter than the upper finger 50 and the tip or outer end 52 of the upper finger 50 is curved forwardly as shown. At its other end or base the finger 50 is spaced from the forward face of the post extension member 46 to provide a clearance slot 53 between these members for accommodating the end portion of the lower finger on the cooperating divider plate on the other conveyor 31 when it moves into casing constricting relation therewith in the path between the conveyors 30 and 31.

The upstanding plate extension 46 is provided at its upper edge with a pin 54 which extends in a horizontal plane normal to one of the side faces of the plate portion 46 and which provides a pivoted connection for the lower end of a swingable connecting plate member 55. The plate member 55 extends above the conveyor 30 and is provided at its upper end with a flanged edge which carries a pivot member 56 providing a connection with a cross bar member 57 extending in a horizontal plane across the top of the conveyors. The upper edge of the plate extension 46 is notched to provide a generally vertical abutment surface 58 adjacent the pivot 54 which limits the inward swinging movement of the connecting plate 55 about the pivot 54 and a generally horizontal abutment surface 59 which limits the outward swinging movement of the connecting plate 55 about the pivot 54.

The conveyor 31 comprises upper and lower chains 60 and 61 which are supported at the trailing end of the conveyor on idler sprockets 62 and 63 mounted in vertically spaced relation on the idler shaft 35. At the forward end of the conveyor 31 the chains 60 and 61 are carried on vertically spaced sprockets 64 and 65 which are secured on the driven shaft 34. The chains 60 and 61 carry a plurality of longitudinally spaced vertically extending tubular bearing forming members 66 each of which is secured at opposite ends to the chain links by brackets 67 and 68. The tube members 66 each support in rotatable relation therein a relatively small vertical shaft 69 having an upwardly extending generally rectangular plate-like top extension 70. The plate extension 70 has secured on one of its faces a generally rectangular divider plate 71 which extends inwardly over the conveyor in a vertical transverse plane and which is adapted to cooperate with a divider plate 47 on the conveyor 30. An inwardly extending V-shaped slot 72 in the inner vertical edge of the plate 71 terminates in a curved apex 73 and divides the plate 71 into upper and lower generally triangular finger portions 74 and 75, with the lower finger portion 75 being in a vertical plane offset forwardly of the plane of the upper finger portion 74 and providing a space 76 between its base portion and the forward face of the plate 70 to accommodate the finger 51 on the cooperating dividing plate 47 on the conveyor 30. The lower finger portion 75 is somewhat shorter than the upper finger 74 and is curved forwardly at its tip 77. The plate extension 70 carries at its upper end a pivot pin 78 which extends in a horizontal plane normal to the face of the plate extension 70 and which forms a pivot for a rectangular connecting plate 79 which is connected thereto and extends above the same. The connecting plate 79 is flanged at its upper end and carries a horizontally extending pivot pin 80 for connecting the same to a cross bar member 57. The upper edge of the plate extension 70 is notched to provide a generally vertical abutment edge or surface 81 adjacent the pivot 78 which limits the inward swinging movement of connecting plate 79 about the pivot 78 and a generally horizontal abutment surface 82 which limits the outward swinging movement of the connecting plate 79 about the pivot 78.

The cross bar 57 and the connecting plate members 55 and 79 provide a connecting bridge structure extending across the top of the conveyors 30 and 31 which holds each set of the cooperating divider plate members 47 and 71 in alignment in a transverse plane extending across the path formed between the opposed inner runs of the conveyors. The cooperating divider plates 47 and 71 are held in alignment in a single plane as they move in their orbit around the conveyors with the respective plates of each pair of divider plates being separated when they are traversing the outer runs of the conveyors and being brought into interleaved casing constricting relation when they are traversing the inner runs of the conveyors. The connecting bar 57 is in the topmost position (Figs. 4 and 5) when the divider plates 47 and 71 are traversing the outer runs of the conveyors and in the lowermost position when the divider plates 47 and 71 are transversing the inner opposed runs of the conveyors, the bar 57 being pulled to the lower elevation by the angular position of the pivoted connecting plates 55 and 79. With this arrangement the top connecting or bridging structure of a pair of the divider plates 47 and 71 which is traversing the inner runs of the conveyors passes beneath the bridging structures connecting the pairs of plates 47 and 71 which are traversing the outer runs of the conveyors. The bridging structure holds the plates 47 and 71 in almost perfect transverse alignment so that the fingers thereon move into and out of interleaved relation without interference and advance the filled casing between the inner runs of the conveyors 30 and 31 while simultaneously dividing the casing into link forming sections of identical length. The top extension plates 46 and 70 are provided with inwardly extending notches 83 and 83' in their outer vertical edges to accommodate rigid horizontal guide bars 84 and 84' which are arranged along the pathway between the conveyors 30 and 31 and which form guide members for the casing 19, particularly, at the start of the feeding operation. The guide bar 84 is supported by a bracket plate 85 extending upwardly of the support plate 11 and attached to the latter by a bottom flange 85' while the guide bar 84' is supported on a similar upstanding plate member 86 having a base flange 86' attached to the base plate 11. The guide bars 84 and 84' are rounded at their opposite ends to guide the casing and to accommodate the plate members 46 and 71 as they pass around the end sprockets at the ends of the conveyors. A horizontally extending bottom support plate 87 for the casing 19 is arranged beneath the path of travel of the casing between the conveyors 30 and 31 and is supported on the posts 88 extending upwardly from the base plate 11. The bottom edges of the divider plates 47 and 71 advance above the top surface of the support plate 87 as these members traverse the inner runs of the conveyors.

The conveyor 30 is also provided with a plurality of plate-like casing engaging fingers 90 which are arranged in longitudinally spaced relation intermediate the divider plates 47. Each of the casing engaging fingers 90 is mounted on the top of a post member 91 which is connected in rigid relation to the upper and lower chains 36 and 37 by bracket members 92 and 93. Each of the fingers 90 extends outwardly of the conveyor in a plane normal to the travel of the conveyor and is provided on its outer edge with a semi-circular inwardly extending recess 94 for engaging the side wall of the casing 19 as these members pass along the inner run of the conveyor 30. The conveyor 31 is provided with a plurality of cooperating plate-like casing engaging fingers 95 which are mounted on the tops of posts 96 which are secured to the upper and lower chains 64 and 65 by brackets 97 and 98 and which have in their outer edges an inwardly extending semi-circular recess 99 for engaging the casing 19 as these members pass between the conveyors. The casing engaging fingers 90 and 95 are spaced on the conveyors 30 and 31 so that they pass into engagement with the casing 19 in aligned pairs and lightly grip the casing 19 on opposite sides.

The conveyors 30 and 31 are driven in synchronized relation by the gears 100 and 101 which are mounted on the shafts 32 and 34, both of the latter being journaled in the base plate 11 and extending to a cross plate 102 spaced below the plate 11, where the ends thereof are received in suitable bearings 103, 103'. A beveled gear 104 is mounted on the shaft 34 and engages with a bevel gear 105 on the end of a driven stub shaft 106 which extends through and is mounted in a suitable bearing 107 in a support plate 108 the latter being secured to the base plate 11. The cross plate 102 is attached to the lower end of the vertical plate 108 at one end and to a suspension plate 109 at the other end, the latter depending from the outside edge of the base plate 11.

The link twisting mechanism is supported on a frame 13 at the forward or front end of the support plate 11 and extends transversely of the path of travel of the casing 19. The frame 13 (Figs. 1, 2, 7 and 10) comprises an outer vertical plate member 110 which is supported by four vertically spaced horizontally extending support bars 111, 112, 113, and 114 extending from the plate 110 to the transmission housing 14. The two topmost support bars 111 and 112 and the lowermost support bars 113 and 114 provide transverse guide structures for supporting in horizontal reciprocating relation thereon upper and lower carriages 115 and 116 which carry vertically spaced transversely extending twisting rollers 117 and 118. The upper twisting roller 117 is mounted on a splined shaft 119 which is journaled at one end the lower end of the carriage forming L-shaped bracket 115 which bracket is provided with vertically spaced top and bottom guideway forming apertures 121 and 122 in which the guide bars 111 and 112 are received in sliding relation. The other end of the splined shaft 119 is slidably received in the hub of a drive gear 123 in the transmission housing 14, which is connected in sliding relation with the shaft 119 for driving the same.

The lower twisting roll 118 is mounted in a similar manner on a splined shaft 124 which is journaled at its one end in the upper end of the lower carriage forming bracket member 116, the latter being of inverted L-shaped form and having upper and lower guideway forming apertures 126 and 127 for receiving the guide bars 113 and 114 in sliding relation therein. The other end of the splined shaft 124 is received in slidable relation within the hub of a drive gear 128 which is in the transmission housing 14. The gears 123 and 128 are arranged one above the other and are supported and driven in a manner which will be described.

The carriages 115 and 116 are reciprocated horizontally by means of connecting rods 130 and 131 which are connected at one of their ends to the carriages 115 and 116 by ball and socket joints 132 and 133, respectively. At their opposite ends the connecting rods 130 and 131 are pivotally connected at 134 and 135 to the outer ends of crank arms 136 and 137 (Figs. 7 and 10). The crank arms 136 and 137 are secured to the top and bottom ends respectively of a vertical crank shaft 138 which is supported in a generally rectangular bearing block or bracket member 139. The bracket member 139 extends transversely within the housing 14 and is provided with a rectangular aperture 140 through which the shaft 138 extends. The shaft 138 carries a bevel gear 141 which is in driven engagement with a bevel gear 142 on a horizontally extending stub shaft 143 which is journaled in the outer end wall of the bracket member 139 and which carries on its outer end a drive gear 144.

The bearing block or supporting bracket member 139 for the crank shaft 138 is positioned between the vertical side walls 145 and 146 of the transmission housing 14 with opposite ends spaced from said side walls (Figs. 7 and 10). At the end adjacent the inner side wall 145 the bearing block 139 is provided with vertically spaced end wall apertures 147 and 148 which receive the ends of the fixed cross bars 112 and 113, the latter extending through apertures 149 and 150 in the wall member 145 and being supported by the latter. At the other end the bearing block 139 is supported on vertically spaced pivot members 151 and 152 which extend inwardly of the wall 146 and into suitable apertures in the end wall of the block 139, and which form supporting pivot members for one end of upper and lower end plate members 153 and 154. The end plate members 153 and 154 are secured adjacent their other ends to the ends of the upper and lower cross bar members 111 and 114, respectively, and form swingable end supports for the latter. The end plate members may be held against movement on the pivot members 151 and 152 by set screws 155 and 156. The pivot members 151 and 152 which form fixed supports for the outer end of the bearing block 139 are aligned with the axis of the cross bars 112 and 113, respectively.

At their other ends adjacent the support plate 110 (Figs. 1 and 7) the cross bars 111 and 114 are secured to the upper and lower ends of end plates 157 and 158 which are pivotally connected at their opposed inner ends on the intermediate cross bars 112 and 113 for swinging movement about the latter. These end plate members may be held against swinging movement by set screws 159 and 160. The vertical plate 110 is slotted at 161 and 162 to provide limited movement of the upper and lower cross bars 111 and 114 about the intermediate cross bars 112 and 113. The cross bars are all provided with reduced end portions which are threaded to receive end clamping nuts for securing the bars relative to the support plate 110. The inner end wall 145 of the transmission housing 14 is provided with suitable slots 163 and 164 to permit limited adjustment of the position of the cross bars 111 and 114. The wall 145 is also provided with relatively wide elongate slots 165 and 166 to permit movement of the connecting rods 130 and 131 for reciprocating the carriages 115 and 116 and for adjustment of the position of the rolls 117 and 118 which is accomplished by adjustment of the top and bottom cross bars 111 and 114 in the manner described.

The drive gears 123 and 128 for the splined shafts 119 and 124 are journaled in the outer ends of arms or plate members 167 and 168 which are pivoted at their inner ends for swinging movement about the axis of cross bars 112 and 113, respectively. The arm members 167 and 168 are located in the transmission housing 14 adjacent the inner end of the bearing block 139 (Figs. 7, 10 and 11). Idler gears 169 and 170 are mounted on the inner ends of the cross bars 112 and 113 which are in driving engagement with the gears 123 and 128, respectively, and also with each other. The idler gears 169 and 170 are driven by drive gear 171 which is secured on drive shaft 172, the latter being journaled in the walls 145 and 146 of the transmission housing 14 and being driven from the gear 144 by a connecting pinion 173 on the outer end of the shaft 172. The gears 123 and 128 are, of course, driven by the idler gears 169 and 170 regardless of the adjustment of their supporting arms 167 and 168 relative to the cross bars 112 and 113. The casing wall 145 is slotted at 174 and 175 to permit movement of the splined shafts 119 and 124 with the arms 167 and 168.

The frame for the twisting mechanism also supports a pair of rolls 181 and 182 (Figs. 8 and 9) which receive the links from the twisting rolls 117, 118 and deliver the same to a chute 183 at the discharge end of the machine. The delivery rolls 181 and 182 are mounted on shafts 184 and 185 which are journaled in the free ends of pairs of laterally spaced support plates or arms 186, 187 and 188, 189. The support plates 186 and 187 are secured at their opposite ends to a support rod 190 which is in turn secured to a pair of bracket forming arms or plates 191 and 192 which are mounted at their opposite ends on the intermediate cross bar 112. The support plates 188 and 189 for the shaft 185 are secured at their opposite ends to a support rod 193 which is in turn secured to a pair of bracket forming arms or plates 194 and 195 with the latter being mounted on the intermediate cross bar 113. The plates 191, 192 and 194, 195 may be adjustably secured to the support rods 190, 193 and the cross bars 112 and 113 by set screws to provide for adjustment of the space between the rolls 181 and 182. The roller shafts 184 and 185 are rotated by a drive mechanism which comprises links 196 and 197 which are connected at one end to the ends of the shafts 184 and 185 by universal joints at 198 and 199 and which are connected at their opposite ends to the ends of driven shafts 200 and 201, by similar universal joints 202 and 203. The shafts 200 and 201 are journaled at their ends in the inner wall 145 of the housing 14 and carry interengaging gears 204 and 205. The shaft 200 carries a gear 206 which is in driven relation with the idler gear 169 on the cross bar 112 within the housing 14. The drive shafts 200 and 201 extend across the housing 14 and are journaled at the opposite ends in the outer side wall 146.

A link supporting plate 207 is provided to bridge the space between the twisting rolls 117 and 118 and the rolls 181 and 182 which is secured in horizontal relation by means of a bracket 208 on the cross bar 113. Plate 207 guides the links and supports the same as they pass from the twisting rolls 117 and 118 and advance between the rolls 181 and 182.

The delivery or discharge chute 183 (Figs. 1, 2 and 9) comprises a plate or tray-like member having side flanges 209 which are provided with slots 210 at the upper ends for supporting the same in downwardly inclined relation by engagement with supporting pins 211 and 212 which extend inwardly of the vertical frame plate 110 and the inner wall member 245 of the housing 14, respectively. A guard plate 213 is supported above the upper portion of the discharge chute 183 by means of links 214 attached at the upper ends to small arm members 215 extending from a top brace rod or bar 216 which extends from the plate 110 through the housing 14. A similar brace rod or bar 217 extends from the bottom of the vertical plate 110 through the housing with both of these rods forming part of the main supporting frame structure.

The power drive mechanism for the machine (Figs. 1, 10 and 11) comprises a motor 220 which is mounted in a suitable manner in the housing 14 and which carries on its drive shaft a gear 221. The gear 221 engages with a gear 222 which is mounted on the outer end of a cross shaft 223 which is journaled in the outer side wall 146 of the transmission housing 14. The shaft 223 carries adjacent the inner face of the wall 146 a pinion 224 which engages with a gear 225 on a cross shaft 226 journaled in the wall 246. The gear 225 engages with the gear 227 on a transversely extending drive shaft 228. The drive shaft 228 carries on its outer end a pinion 229 which is in driving engagement with the gear 144. At its other or inner end the drive shaft 228 carries a gear 230 which is in driving relation with a gear 231 on a relatively short drive shaft 232. The shaft 232 extends between the inner side wall 145 of the housing 14 and the vertical support plate 108 (Fig. 2) on the divider structure. It is journaled at one end in the support plate 108 and at the other end in a parallel support plate 233 which is connected in spaced relation to the support plate 108 by a vertically extending cross tie plate 234 and a relatively narrow top plate 235. The gear 231 is removably secured on the end of the shaft 232 which extends through an aperture 236 in the wall member 245 and which carries a sprocket 237. The sprocket 237 is connected by a driving chain 238 with a sprocket 239 on the end of the stub shaft 106 and provides the drive for the divider members.

The support plates 108, 233, 234 and 235 provide a connecting frame structure between the divider mechanism and the transmission housing 14. The wall member 145 of the housing 14 is provided with a slot 240 for receiving an extended end portion 241 of the top plate 235 which is adapted to project into the housing 14 and engage beneath the lower edge a relatively small vertically extending abutment plate 242 which is mounted on a pair of brace rods 243 and 244 extending transversely between the wall members 145 and 146 of the transmission housing. A locking bolt 245 is provided in the top plate extension 241 which is adapted to engage in threaded relation in a suitable aperture provided in one of the brace rods 244. With this construction the divider mechanism is detachably connected in rigid relation with the housing 14 and may be separated therefrom and removed from the machine as a unit by merely removing the locking bolt 245 from the plate 241 and the pinion gear 231 from the end of the shaft 232.

The twisting rolls 117 and 118 and delivery rolls 181 and 182 are especially constructed to prevent injury to the relatively fragile casing while the latter is passing between the same. Since these rolls are formed in the same manner only one will be described in detail. The roll 118 (Figs. 9 and 13) is formed of "neoprene" which is a rubber-like plastic material especially resistant to oils, greases and the like. The surface of the roll is divided by a plurality of axially extending circumferentially spaced grooves 250 which are arranged so that they form a series of ribs or fins 251 projecting in a generally radial direction relative to the axis of rotation 252. The trailing side or surface 253 of each rib 251 is in a plane which extends slightly in advance of the axis 253 of the roll or at a slight angle to a radial plane. The leading side or surface 254 of each rib 251 is in a plane extending at a somewhat greater angle to a radial plane. The outer edges of the ribs 251 are preferably provided with axially spaced serrations 255 and the ribs may also have spaced perforations 256 to increase their flexibility. The thickness of the ribs 251 may be varied to provide more or less flexibility in the ribs as desired. Preferably, the ribs in the lower rolls 118 and 182 are made somewhat stiffer than the upper rolls 117 and 181. As the link forming sections of the stuffed casing 19 advance between the spaced rolls of each pair of rolls 117, 118 and 181, 182 the rib formations 251 which are moving in a radial path strike the edges thereof against the exterior walls of the casing and readily flex or bend without any tendency to dig into the casing while simultaneously gripping the casing surfaces with sufficient friction to control the movement of the same and accomplish the advancing and twisting of the successive links.

The divider mechanism 10 and twisting mechanism 12 are lubricated by water or other fluid which is delivered to a conduit 260 (Figs. 1 and 2) from a suitable source indicated at 261. The conduit 260 is mounted on the upper portion of the inner wall 245 of the transmission housing 14 and is connected at the end to two small pipes 262 and 263 which extend across the frame support 13 for the twisting mechanism 12. The pipe 262 is provided with rearwardly directed spray nozzles 264 and 265 while the pipe 263 is perforated to discharge the fluid onto the mechanism beneath the same. Suitable splash guard members 266 and 267 may be provided along the sides of the divider mechanism 12.

In operation a length of stuffed casing 19 is fed by the guide members 20, 23, 26 and 28 to the divider mechanism 12. The casing 19 is supported and guided by the guide members 84, 84' and 87 as it passes between the conveyors 30 and 31. The cooperating divider plates 47 and 71 move into engagement with the casing at spaced intervals and constrict the casing to divide it into link forming sections of uniform length. The bridging structure which connects each pair of the divider plates 47 and 71 holds the plates in transverse alignment so that they move into and out of interleaved relation with a minimum of friction and with a smoothness of operation which avoids any damage to the casing. The swinging movement of the connecting plate members 55 and 79 results in the bridging structures passing each other without intereference as the top cross bars 57 move down at the entrance end of the conveyors and up at the discharge end thereof where the divider plates 47 and 71 release the constricted and twisted casing section between the advancing link and the next succeeding or trailing link section. The reciprocating twisting rolls 117 and 118 are arranged relatively close to the end of the divider mechanism 12 to receive each successive advancing link section and perform the twisting operation while the oncoming pair of divider plates 47 and 71 engage and grip the casing in the area between it and the remainder of the casing or the next succeeding link section being formed by the divider mechanism 12.

The twisting rolls 117 and 118 advance the link sections, due to their rotation, to the delivery or discharge rolls 181, 182 and also twist each link about its axis as it advances, due to their reciprocating movement, the rolls being rotated in opposite directions and at a speed to advance the link sections so that alternate link sections are twisted or axially rotated in opposite directions. The rolls 181, 182 are adjusted so that they take over the advancing movement of each link section as the twisting thereof by the rolls 117, 118 is completed and hold the same against further axial rotation thereof upon the reciprocation of the rolls 117, 118 being reversed so that each link section while advancing between the twisting rolls 117, 118 is given the same amount of axial rotation or the same number of twists and the casing area between each link and the next succeeding link receives twice the number of twists due to the reverse movement of the rolls in each reciprocation thereof.

While the mechanism described is particularly adapted for use in the linking of pork sausage which is stuffed in a relatively fragile and readily broken natural casing it may be employed in the linking of any other product of a similar nature. Also specific details of construction which are herein described are deemed illustrative of the invention only and it is understood that other details of construction may be resorted to within the spirit of the invention.

I claim:

1. In a linking machine, a supporting frame, guard members mounted on said frame for directing a continuous length of filled casing along a linear path, a pair of elongate endless conveyors mounted on said frame adjacent said guard members, said conveyors having spaced opposed runs on opposite sides of said path, drive means connected to said conveyors for moving the same in opposite directions, and cooperating divider elements mounted on said conveyors at longitudinally spaced points, each of said divider elements having a plate-like portion extending laterally and outwardly of the conveyor on which it is mounted and being supported for rotating movement relative to said conveyor, said plate-like portion having an outer edge with an outwardly opening slot therein and being movable by said conveyor into cooperative casing constricting relation with the corresponding portion of a divider element on the opposite conveyor whereby to constrict the casing to a relatively small area defined by the slots in said divider elements.

2. In a linking machine as recited in claim 1 and means connected to said divider elements for controlling the rotation thereof relative to said conveyor, and means to operate said conveyors in timed relation to bring the plate-like portions of cooperating pairs of said divider elements into generally parallel and interleaved engagement as they approach each other upon advancing movement of said conveyors.

3. In a linking machine, a supporting frame, guide members mounted on said frame for guiding a continuous length of filled casing along a linear path, a pair of elongate endless conveyors mounted on said frame, said conveyors having spaced opposed runs extending along said guide members on opposite sides of said path, drive means connected to said conveyors for moving the same in opposite directions, cooperating divider elements pivotally mounted on said conveyors at longitudinally spaced points, each of said divider elements having a plate-like portion extending outwardly of the pivotal mounting and being supported for swinging movement relative to said conveyor, said plate-like portion having an outer edge with an inwardly extending V-shaped slot therein and being movable by said conveyor to bring said plate-like portion into cooperative casing constricting relation with the corresponding portion of a divider element on the opposite conveyor whereby to constrict the casing to a relatively small area defined by said V-shaped slots.

4. In a linking machine as recited in claim 3 and means connected to said divider elements for controlling movement of the same relative to said conveyor, and means to operate said conveyors in timed relation to bring the plate-like portions of cooperating pairs of said divider elements into generally parallel and interleaved engagement as they approach each other and move along the opposed runs of said conveyors.

5. In a sausage linker, a supporting frame, guiding and supporting members on said frame defining a linear path for a length of filled sausage casing, pairs of cooperating divider elements mounted in spaced relation on said frame with the respective elements of each pair moving in a closed orbit on opposite sides of said path defining members, means on said frame for supporting the respective divider elements and for moving the same in their respective orbits, the divider elements of each pair having slotted portions adapted to engage the casing on opposite sides thereof, and a movable linkage extending across said path defining members and connecting the divider elements of each pair thereof, said linkage holding said elements in aligned relation during their movement along said path defining members.

6. In a machine for dividing a relatively long length of stuffed casing into a plurality of connected links of uniform length, a supporting frame, means on said frame for guiding a continuous length of filled sausage casing along a linear path, spaced pairs of cooperating divider elements movably mounted on said frame, means on said frame for moving the respective elements of each pair in a closed orbit on opposite sides of said guiding means, the respective divider elements of each pair having plate-like portions provided with outwardly extending casing engaging fingers, and means extending across said guiding means and connecting the divider elements of each pair thereof whereby to hold said fingers in predetermined cooperating relation during their movement along said guiding means.

7. In a linking machine, a supporting frame, means on said frame for guiding a continuous length of filled casing along a linear path, spaced pairs of cooperating divider members movably mounted on said frame with the respective members of each pair moving in a closed orbit on opposite sides of said casing guiding means, means on said frame for supporting the respective divider members and for moving the same in their respective orbits, the respective divider members of each pair having finger portions positioned to engage the casing, and pivotally connected members forming a movable linkage connecting the respective members of each pair of said divider members for holding said divider members in predetermined transverse alignment as they move in their orbits whereby they engage and divide the casing during their movement along said casing guiding means.

8. In a sausage linker, a supporting frame, guiding and supporting means on said frame defining a linear path for a continuously moving length of filled sausage casing, elongate laterally spaced endless chain conveyors mounted on said frame with opposed runs thereof along opposite sides of said guiding and supporting means, plate-like divider elements mounted on said conveyors with the respective elements of each pair moving in a closed orbit on opposite sides of said guiding and supporting means, each of said divider elements having an outer edge with a V-shaped slot extending inwardly thereof which divides the element into spaced finger forming portions with the finger forming portions arranged in offset planes whereby the finger forming portions of one divider element of each pair are adapted to interleave with the finger forming portions of the other divider element of said pair and cooperate therewith to engage the casing in encompassing relation, means for pivotally supporting the respective divider elements and for moving the same in their respective orbits, and means extending across said guiding and supporting means for connecting the divider elements of each pair thereof and for holding the finger forming portions of said elements in predetermined interleaved relation during their movement along said guiding and supporting means.

9. In a linking machine, a supporting frame, guide members mounted on said frame for guiding a continuous length of filled casing along a linear path, a pair of elongate endless conveyors mounted on said frame with laterally spaced opposed runs extending along said guide members on opposite sides of said path, drive means connected to said conveyors for moving the same in opposite directions, cooperating divider elements pivotally mounted on said conveyors at longitudinally spaced points, each of said divider elements having a plate portion extending outwardly of the pivotal mounting, said plate-like portion having an outer edge provided with an inwardly extending generally triangular slot therein which terminates in an apex formed by a curved edge of relatively small radius, said divider elements being movable by said conveyors into cooperative casing constricting relation with the curved apex forming portions of said slots engaging on the opposite sides of the casing to reduce the same to a relatively small cross sectional area, and means extending transversely of said conveyors and connecting each divider element on one conveyor with the cooperating divider element on the other conveyor for controlling the movement of said divider elements.

10. In a sausage linker, a supporting frame, means mounted on said frame for advancing a continuous length of filled sausage casing, guiding and supporting members on said frame adjacent said casing advancing means and defining a linear path for said casing, pairs of cooperating divider elements movably mounted on said frame with the respective elements of each pair moving in a closed orbit along opposite sides of said guiding and supporting members, means mounted on said frame for supporting the respective divider elements and for moving the same in their respective orbits, the divider elements of each pair having portions which extend between said guiding and supporting members and engage the casing in encompassing relation while the casing is moving in said linear path, and means extending across said divider supporting means and connecting the respective divider elements of each pair for holding said elements in predetermined relation during their movement along said guiding and supporting members.

11. In a linking machine, a supporting frame, guide members mounted on said frame for guiding a continuous length of filled casing along a linear path, a pair of elongate endless conveyors mounted on said frame with laterally spaced opposed runs extending along said guide members on opposite sides of said path, drive means connected to said conveyors for moving the same in opposite directions, cooperating divider elements pivotally mounted on said conveyors at longitudinally spaced points, each of said divider elements having a plate portion extending outwardly of the pivotal mounting, said plate portion having an outer edge provided with an inwardly extending generally triangular slot which terminates in an apex formed by a curved edge of relatively small radius, and means connected to said divider elements for controlling the pivotal movement of the same relative to said conveyors whereby movement of said conveyors brings the plate portions of cooperating pairs of said divider elements into generally parallel and interleaved engagement as they approach each other and move along the opposed runs of said conveyors, said plate portions moving toward each other sufficiently to bring the curved apex forming portions of said slots into cooperative casing engaging relation on the opposite sides of the casing to reduce the same to a relatively small cross sectional area.

12. In a linking machine, a supporting frame, guide members mounted on said frame for guiding a continuous length of filled casing along a linear path, a pair of elongate endless conveyors mounted on said frame with laterally spaced opposed runs extending along said guide members on opposite sides of said path, drive means connected to said conveyors for moving the same in opposite directions, cooperating divider elements pivotally mounted on said conveyors at longitudinally spaced points, each of said divider elements having a plate-like portion extending outwardly of the pivotal mounting, said plate-like portion having an outer edge provided with an inwardly extending generally triangular slot, and a linkage extending above said divider elements and connecting each of the divider elements to its cooperating divider element, said linkage holding the plate-like portions of the divider elements in transverse alignment, said linkage being collapsible and movable downwardly toward the divider elements as the divider elements move between the opposed conveyor runs whereby the collapsed linkages connecting the divider elements which are moving between the inner opposed conveyor runs pass beneath the extended linkages connecting the divider elements which are moving along the outer conveyor runs.

References Cited in the file of this patent

UNITED STATES PATENTS

| | | |
|---|---|---|
| 589,578 | Schonland | Sept. 7, 1897 |
| 873,877 | Louden | Dec. 17, 1907 |
| 1,848,856 | Wagner et al. | Mar. 8, 1932 |
| 1,903,953 | Anderson | Apr. 18, 1933 |
| 2,165,673 | Mumme | July 11, 1939 |
| 2,482,911 | Holstein | Sept. 27, 1949 |
| 2,542,673 | Hedwall | Feb. 20, 1951 |
| 2,603,343 | Payne | July 15, 1952 |
| 2,663,982 | Conti | Dec. 29, 1953 |
| 2,675,753 | Eber | Apr. 20, 1954 |
| 2,689,972 | Cross | Sept. 28, 1954 |